United States Patent
Ma et al.

(10) Patent No.: US 8,261,352 B2
(45) Date of Patent: Sep. 4, 2012

(54) HYBRID REPRESENTATION FOR DETERMINISTIC FINITE AUTOMATA

(75) Inventors: Qingming Ma, Santa Clara, CA (US); Bryan Burns, Palo Alto, CA (US); Sheng Li, Beijing (CN); Na Liu, Beijing (CN); Xuejun Wu, Beijing (CN); Shan Yu, Beijing (CN); Li Zheng, Beijing (CN)

(73) Assignee: Juniper Networks Inc., Sunnyvale, CA (US)

( * ) Notice: Subject to any disclaimer, the term of this patent is extended or adjusted under 35 U.S.C. 154(b) by 711 days.

(21) Appl. No.: 12/468,454

(22) Filed: May 19, 2009

(65) Prior Publication Data
US 2010/0229238 A1 Sep. 9, 2010

(30) Foreign Application Priority Data
Mar. 9, 2009 (CN) .......................... 2009 1 0126086

(51) Int. Cl.
G06F 21/06 (2006.01)
(52) U.S. Cl. .......................................... 726/23; 709/241
(58) Field of Classification Search ...................... 726/23
See application file for complete search history.

(56) References Cited

U.S. PATENT DOCUMENTS

| | | | | |
|---|---|---|---|---|
| 7,305,383 | B1 * | 12/2007 | Kubesh et al. | 1/1 |
| 7,818,806 | B1 * | 10/2010 | Gyugyi et al. | 726/24 |
| 7,991,723 | B1 * | 8/2011 | Dubrovsky et al. | 706/45 |
| 2008/0034427 | A1 * | 2/2008 | Cadambi et al. | 726/22 |

OTHER PUBLICATIONS

Kumar et al., "Algorithms to Accelerate Multiple Regular Expressions Matching for Deep Packet Inspection", Sep. 2006, SIGCOMM, pp. 339-350.*

Kong et al., "Efficient Signature Matching with Multiple Alphabet Compression Tables", Sep. 2008, SecureComm, pp. 1-10.*

* cited by examiner

*Primary Examiner* — Matthew Smithers
(74) *Attorney, Agent, or Firm* — Harrity & Harrity, LLP

(57) ABSTRACT

A method includes receiving a data unit, determining whether a current state, associated with a deterministic finite automata (DFA) that includes a portion of states in a bitmap and a remaining portion of states in a DFA table, is a bitmap state or not, and determining whether a value corresponding to the data unit is greater than a threshold value, when it is determined that the current state is not a bitmap state. The method further includes determining whether the current state is insensitive, when it is determined that the value corresponding to the data unit is greater than the threshold value, where insensitive means that each next state is a same state for the current state, and selecting a default state, as a next state for the current, when it is determined that the current state is insensitive.

25 Claims, 9 Drawing Sheets

HYBRID REPRESENTATION FOR DETERMINISTIC FINITE AUTOMATA

BACKGROUND

Security devices, such as intrusion detection and prevention (IDP) devices, have become a key component in both service provider and enterprise networks. A conventional technique, utilized by IDP devices to identify attacks, threats, and/or malicious traffic, is based on signatures. These signatures are typically a form of regular expressions (e.g., strings) or sub-strings, which are converted into a Nondeterministic Finite Automata (NFA) or a Deterministic Finite Automata (DFA), and used as a pattern by a matching engine to compare a series of bytes or packet sequences in network traffic. While there are multiple ways to represent a DFA, DFA is susceptible to state explosion since as the number of wildcards in a regular expression increases, the number of DFA states increases, sometimes in exponential fashion. Accordingly, with any DFA representation, there is usually a trade-off between memory consumption versus matching speed.

SUMMARY

According to one implementation, a method performed by a device may include receiving, by the device, a data unit, determining, by the device, whether a current state, associated with a deterministic finite automata (DFA) that includes a portion of states in a bitmap and a remaining portion of states in a DFA table, is a bitmap state or not, determining, by the device, whether a value corresponding to the data unit is greater than a threshold value, when it is determined that the current state is not a bitmap state, determining, by the device, whether the current state is insensitive, when it is determined that the value corresponding to the data unit is greater than the threshold value, where insensitive means that each next state is a same state for the current state, and selecting, by the device, selecting a default state, as a next state for the current state, when it is determined that the current state is insensitive.

According to another implementation, a network device may include a processor, a memory, and a communication interface to receive a data unit, determine whether a current state, associated with a deterministic finite automata (DFA) that includes a portion of states in a bitmap and a remaining portion of states in a DFA table, is a bitmap state or not, determine whether a data value corresponding to the data unit is greater than a threshold American Standard Code for Information Interchange (ASCII) value, when it is determined that the current state is not a bitmap state, determine whether the current state is insensitive, when it is determined that the data value corresponding to the data unit is greater than the threshold ASCII value, where insensitive means that each next state is a same state for the current state, select a default state, as a next state for the current state, when it is determined that the current state is insensitive, and determine whether the next state corresponds to a final state indicative of a threat, an attack, or malicious traffic.

According to still another implementation, a computer-readable medium having stored thereon instructions, executable by at least one processor, may include one or more instructions for receiving a data unit, one or more instructions for determining whether a current state, associated with a deterministic finite automata (DFA) that includes a portion of states in a bitmap and a remaining portion of states in a DFA table, is a bitmap state or not, one or more instructions for determining whether an American Standard Code for Information Interchange (ASCII) value corresponding to the data unit is greater than a threshold ASCII value, when it is determined that the current state is not a bitmap state, one or more instructions for determining whether the current state is insensitive, when it is determined that the ASCII value corresponding to the data unit is greater than the threshold ASCII value, where insensitive means that each next state is a same state for the current state, and one or more instructions for selecting a default state, as a next state for the current state, when it is determined that the current state is insensitive.

According to another implementation, a network device may include means for storing a deterministic finite automata (DFA) that includes a portion of states in a bitmap and a remaining portion of states in a DFA table, means for receiving a data unit, means for determining whether a current state associated with the DFA is a bitmap state or not, means for determining whether a value corresponding to the data unit is greater than a threshold value, means for determining whether the current state is insensitive, where insensitive is that each next is a same state for the current state, and means for selecting a default state, as a next state for the current state, when it is determined that the value is greater than the threshold value and the current state is insensitive.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following description does not limit the invention. Instead, the scope of the invention is defined by the appended claims and equivalents.

Pattern recognition of character strings using regular expressions is one approach used by network security devices. Regular expressions typically include letters, numbers, symbols, or the like. In such an approach, a DFA engine may be used to perform pattern matching with respect to network traffic. The DFA engine may utilize a DFA table or a bitmap. However, drawbacks exist with respect to the DFA table and the bitmap.

One drawback of the DFA table is that it is susceptible to state explosion, which, among other things, translates into memory consumption since each DFA entry requires a separate memory location. Further, there may be a significant number of DFA entries that are the same. That is, a significant number of DFA entries may correspond to the same next state.

In an alternative approach, the DFA engine may utilize a bitmap. While the bitmap may significantly reduce the size of memory consumption compared to the DFA table, the bitmap has drawbacks. One drawback of the bitmap is that it requires two memory accesses by the DFA engine to match an input character with an entry of the bitmap. This is in contrast to the DFA table, which requires only one memory access. Another drawback of the bitmap is that an offset from a default state may need to be calculated to determine the next state.

Embodiments described herein provide methods, devices, and systems that may utilize both the DFA table and the bitmap to determine a next state. In one implementation, as input characters are received, it may be determined whether the input characters have a value (e.g., an American Standard Code for Information Interchange (ASCII) value) greater than a threshold value. Additionally, it may be determined whether the current state is insensitive. A current state may be considered insensitive when each of the next states is a same state, when the input characters have the value greater than the threshold. As will be described, the DFA table the bitmap, or a default state may be utilized depending on these determinations. Stated differently, states of a DFA may be apportioned between the DFA table and the bitmap. In one implementation, the apportionment may be based on states frequently visited, which may be represented in the DFA table, and states infrequently visited, which may be represented in the bitmap. Since the embodiments have been broadly described, variations exist. Accordingly, a detailed description of the embodiments is provided below.

Exemplary Environment

Figure 1:
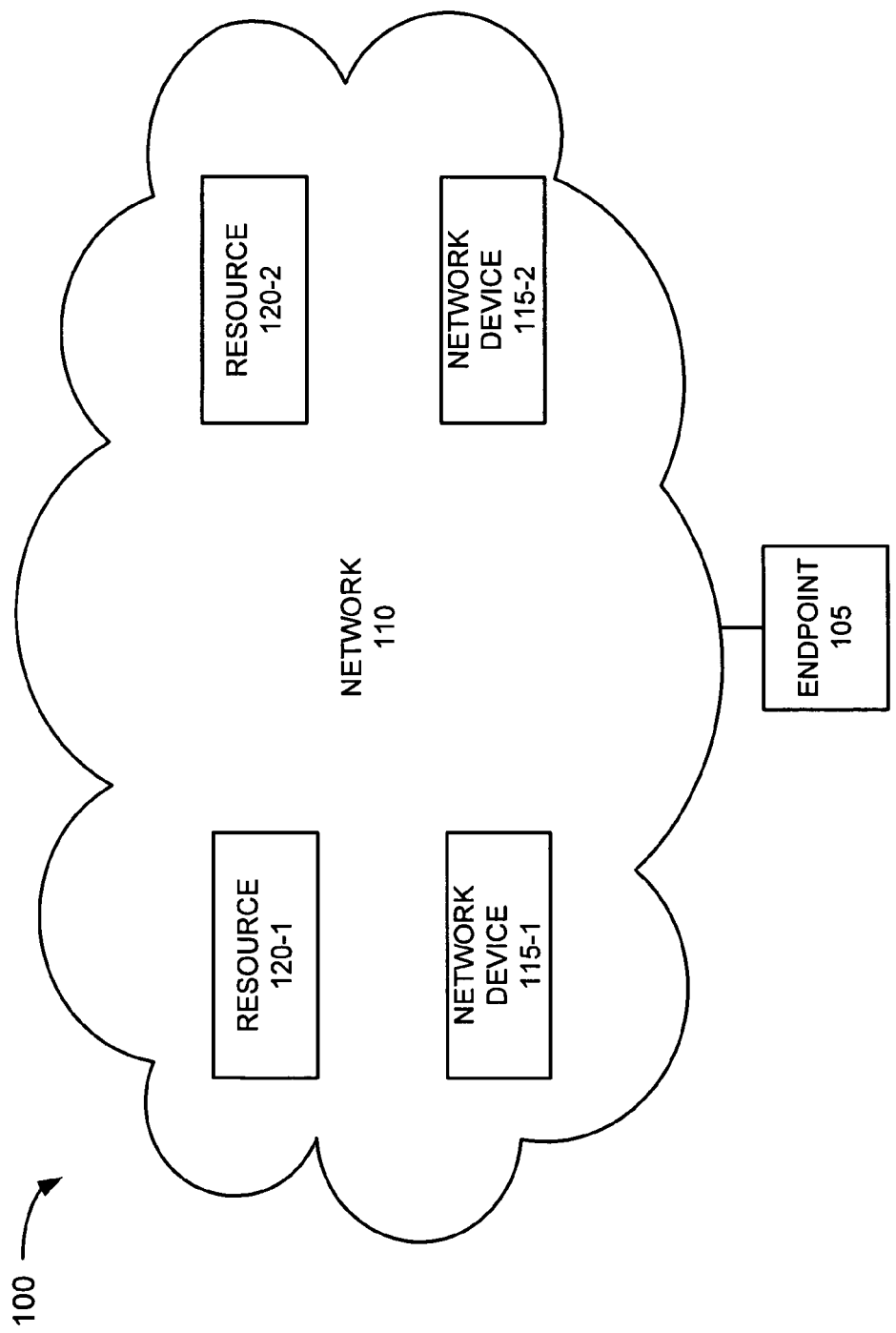
FIG. 1 is a diagram illustrating an exemplary environment in which methods, devices, and systems described herein may be implemented.

FIG. 1 is a diagram illustrating an exemplary environment 100 in which methods, devices, and systems described herein may be implemented. As illustrated in FIG. 1, environment 100 may include an endpoint 105 communicatively coupled to a network 110. Network 110 may include network devices 115-1 and 115-2 (referred to generically as "network device 115") and resources 120-1 and 120-2 (referred to generically as "resource 120"). The number of devices and configuration in environment 100 is exemplary and provided for simplicity. In practice, environment 100 may include more, fewer, different, and/or differently arranged devices than those illustrated in FIG. 1. Also, some functions described as being performed by a device may be performed by a different device or a combination of devices. Environment 100 may include wired and/or wireless connections among the devices.

Endpoint 105 may include a device having the capability to communicate with other devices, systems, networks, and/or the like. For example, endpoint 105 may correspond to a computer (e.g., a laptop, a desktop, a handheld computer), a personal digital assistant, a wireless telephone, or another type of communication device.

Network 110 may include one or multiple networks of any type. For example, network 110 may include a wired network, a wireless network, a private network, a public network, a local area network (LAN), a metropolitan area network (MAN), a wide area network (WAN), the Internet, an intranet, a telephone network (e.g., the Public Switched Telephone Network (PSTN) or a cellular network), a satellite network, a computer network, and/or a combination of networks.

Network device 115 may include a device having the capability to communicate with other devices, systems, networks, and/or the like. For example, network device 115 may correspond to a security device (e.g., an IDP device, a firewall), a router, a switch, a gateway, a bridge, an access point device, or some other type device that may process and/or forward network traffic. While network device 115 may be implemented as different types of devices, in the following paragraphs, network device 115 will be described in terms of an IDP device. Resource 120 may include a device that provides a service, data, or some other type asset.

Exemplary Network Device Architecture

Figure 2:
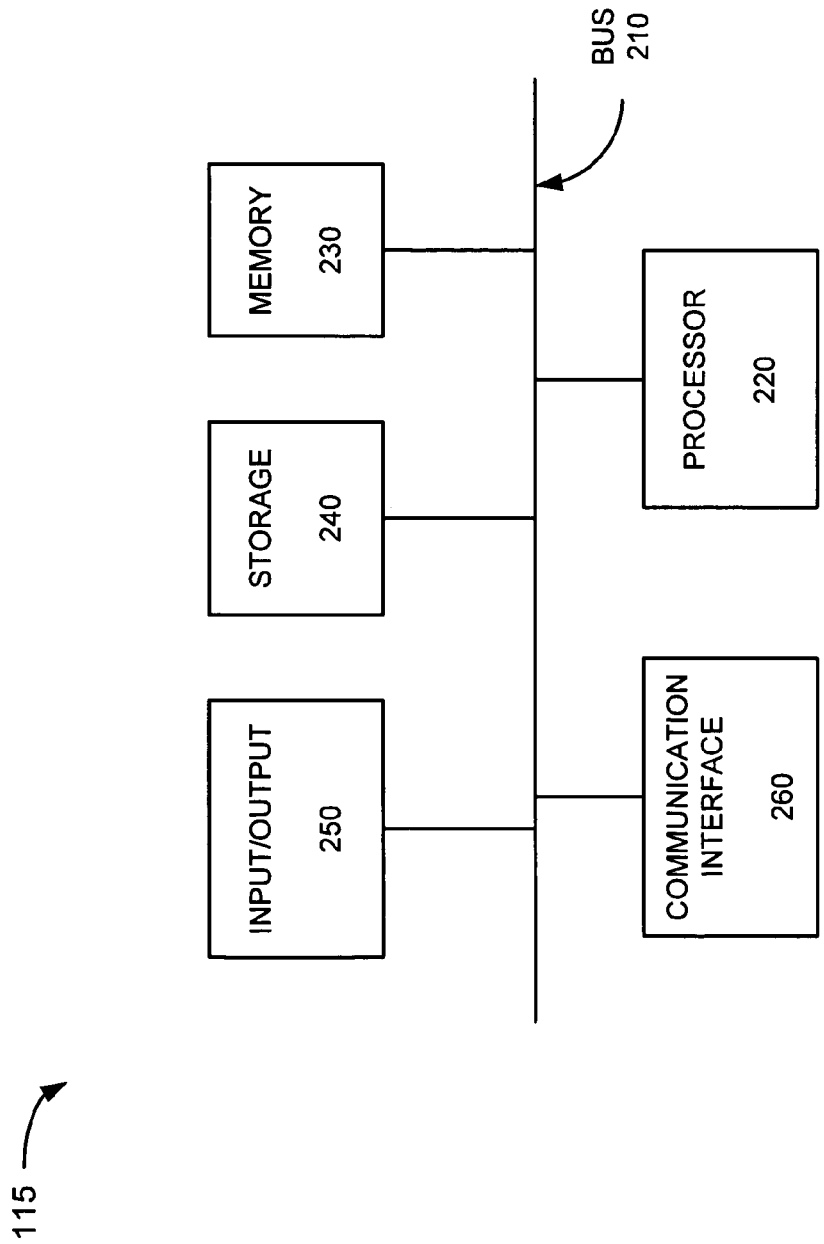
FIG. 2 is a diagram illustrating exemplary components of the network device depicted in FIG. 1.

FIG. 2 is a diagram illustrating exemplary components of network device 115. As illustrated, network device 115 may include, for example, a bus 210, a processor 220, a memory 230, storage 240, an input/output 250, and a communication interface 260.

Bus 210 may permit communication among the other components of network device 115. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a processor, a microprocessor, a data processor, a co-processor, a network processor, an application specific integrated circuit (ASIC), a controller, a programmable logic device, a field programmable gate array (FPGA), or some other processing logic that may interpret and/or execute instructions.

Memory 230 may store data and/or instructions. For example, memory 230 may include a random access memory (RAM), a dynamic random access memory (DRAM), a static random access memory (SRAM), a synchronous dynamic random access memory (SDRAM), a read only memory (ROM), a programmable read only memory (PROM), an erasable programmable read only memory (EPROM), an electrically erasable programmable read only memory (EEPROM), another type of dynamic or static memory, a cache, and/or a flash memory.

Storage 240 may store data, instructions, and/or applications. For example, storage 240 may include a hard disk (e.g., a magnetic disk, an optical disk, a magneto-optic disk, etc.), a compact disc (CD), a digital versatile disc (DVD), a floppy disk, a cartridge, a magnetic tape, a flash drive, or another type of computer-readable medium, along with a corresponding drive. The term "computer-readable medium" is intended to be broadly interpreted to include, for example, memory, storage or another type medium. A computer-readable medium may be implemented in a single device, in multiple devices, in a centralized manner, or in a distributed manner.

Input/output 250 may permit input to and output from network device 115. For example, input/output 250 may include a keyboard, a keypad, a mouse, a button, a switch, a microphone, voice recognition logic, a pen, a display, a port, or the like to permit input. Additionally, or alternatively, input/output 250 may include a display, a speaker, one or more light emitting diodes (LEDs), a port, or the like, to permit output.

Communication interface 260 may enable network device 115 to communicate with another device, a network, another system, and/or the like. For example, communication interface 260 may include a wireless interface and/or a wired interface, such as, an Ethernet interface, an optical interface, etc. Communication interface 360 may include a transceiver.

Network device 115 may perform operations and/or processes related to pattern matching based on a DFA. According to an exemplary implementation, network device 115 may perform these operations and/or processes in response to processor 220 executing sequences of instructions contained in a computer-readable medium. For example, software instructions may be read into memory 230 from another computer-readable medium, such as storage 240, or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of network device 115, in other implementations, network device 115 may include additional, fewer, different, or differently arranged components than those illustrated in FIG. 2 and described herein. Additionally, or alternatively, one or more operations described as being performed by a particular component of network device 115 may be performed by one or more other components, in addition to or instead of the particular component. Additionally, it will be appreciated that other devices (e.g., endpoint 105 and/or resource 120) in environment 100 may include the exemplary components illustrated in FIG. 2.

Figure 3:
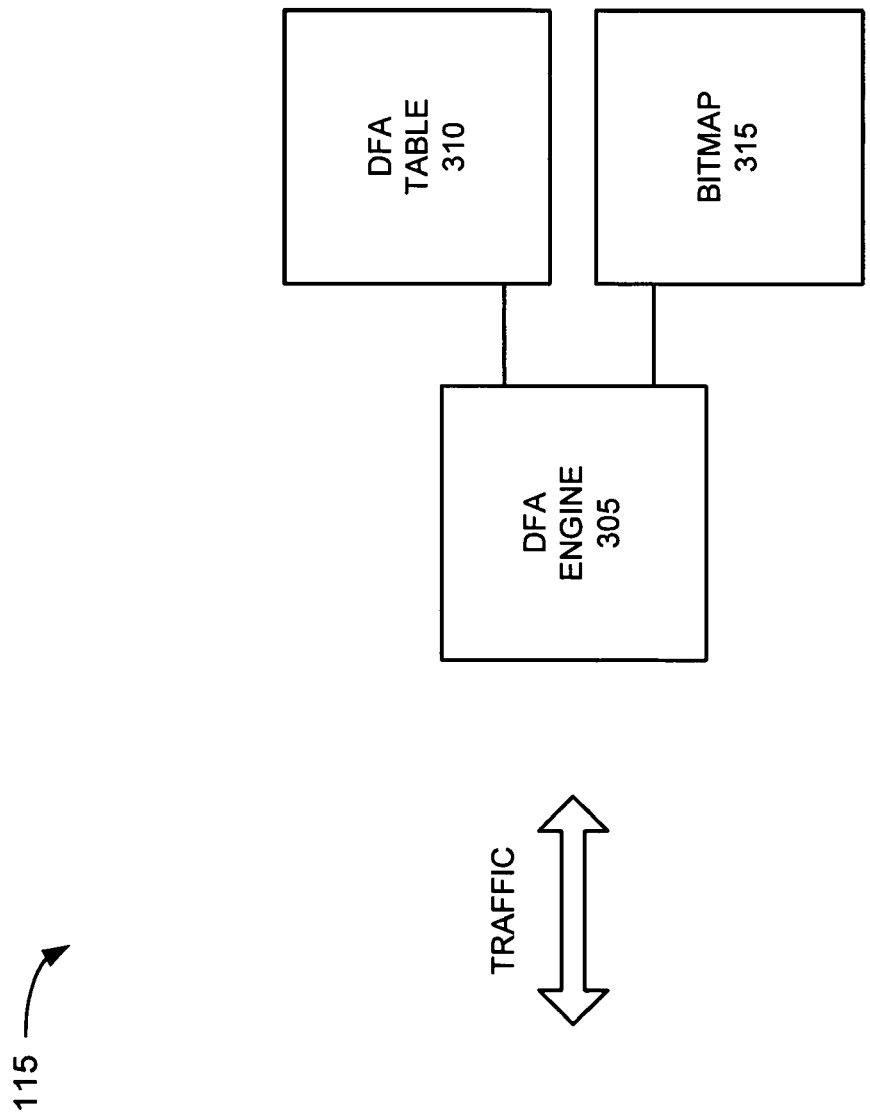
FIG. 3 is a diagram or exemplary functional components of the network device depicted in FIG. 1.

FIG. 3 is a diagram of exemplary functional components of network device 115. As illustrated in FIG. 3, network device 115 may include a DFA engine 305, a DFA table 310, and a bitmap 315. The functional components illustrated in FIG. 3 may be implemented by hardware (e.g., processor 220, memory 230, storage 240, etc.) or a combination of hardware and software. While a particular number and arrangement of components are illustrated in FIG. 3, in other implementations, network device 115 may include fewer, additional, different, or differently arranged components than those illustrated in FIG. 3. Further, it will be appreciated that these functional components may be implemented in other devices (e.g., endpoint 105 and/or resource 120) in environment 100.

DFA engine 305 may receive network traffic in the form of packets. While packets will be used in the description herein, implementations described herein apply to any form of data unit either in the form of a packet, a non-packet, a cell, a datagram, bits, bytes, etc. DFA engine 305 may perform pattern and signature matching necessary to identify attacks, threats, malicious traffic, and/or other forms of content processing. By way of example, DFA engine 305 may identify whether a data unit corresponds to an attack, a threat, or malicious traffic, by comparing the data unit with DFA states. For example, a DFA, representative of a state machine, may include various DFA states. A DFA state may transition from an initial state, to one or multiple intermediary states, to a final state, which may signify the threat, the attack, or malicious traffic. However, unlike existing techniques, where all of the DFA states are represented in either a DFA table or a bitmap. In the hybrid DFA, described herein, a portion of DFA states may be represented in DFA table 310, while a remaining portion of the DFA states may be represented in bitmap 315. In one implementation, DFA table 310 may include DFA states considered to be states frequently visited, as described in greater detail below. Additionally, or alternatively, bitmap 315 may include DFA states considered to be rarely visited, as described in greater detail below.

DFA table 310 may correspond to an arrangement of data representing DFA states. As previously described, DFA table 310 may be generated based on a conversion from regular expressions. Bitmap 315 may correspond to an arrangement of data representing DFA states. Bitmap 315 may be generated based on a conversion from regular expressions. Examples of DFA table 310 and bitmap 315 are provided below.

Figure 4A:
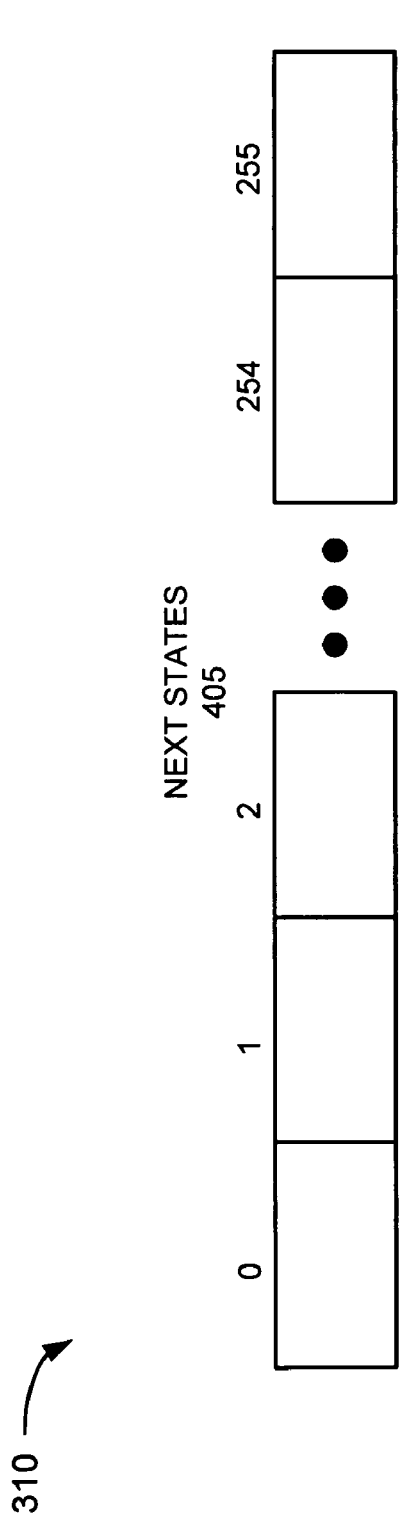
FIGS. 4A and 4B are diagrams of exemplary implementations of the DFA table depicted in FIG. 3.
Figure 4B:
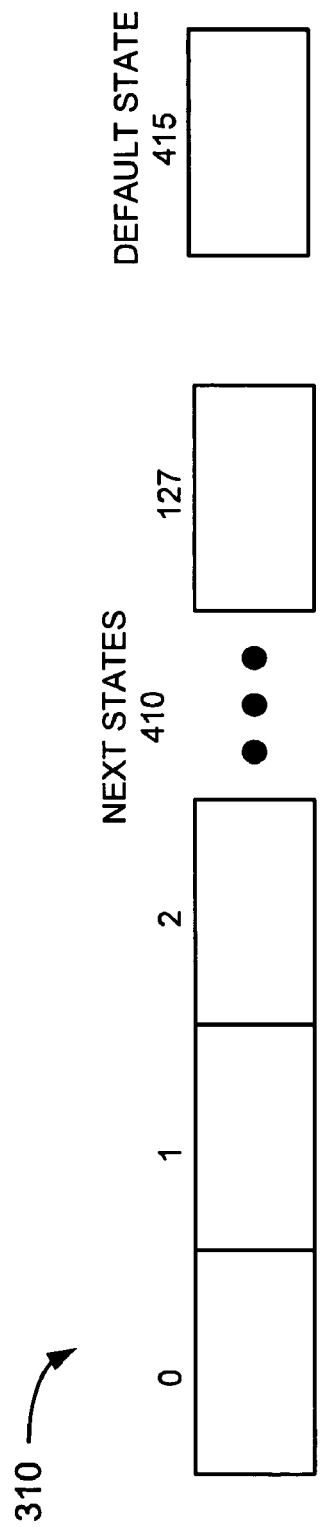

FIGS. 4A and 4B are diagrams illustrating exemplary implementations of DFA table 310. As illustrated in FIG. 4A, DFA table 310 may include next states 405. In this implementation, DFA table 310 may correspond to a 256 array of next states. DFA engine 305 may index next states 405 based on the corresponding 256 ASCII values associated with an input character. In other implementations, however, DFA table 310 may include next states 410. In this implementation, DFA table 310 may correspond to a 128 array of next states and a default state 415. In this case, DFA engine 305 may index next states 410 based on the corresponding 128 ASCII values, and the remaining 128 ASCI values may serve as an index to default state 415. Still further, in other implementations, DFA table 310 may include fewer, additional, or different fields and/or number of fields. As previously mentioned, DFA table 310 may be utilized to determine a next state based on a received input.

Figure 5:
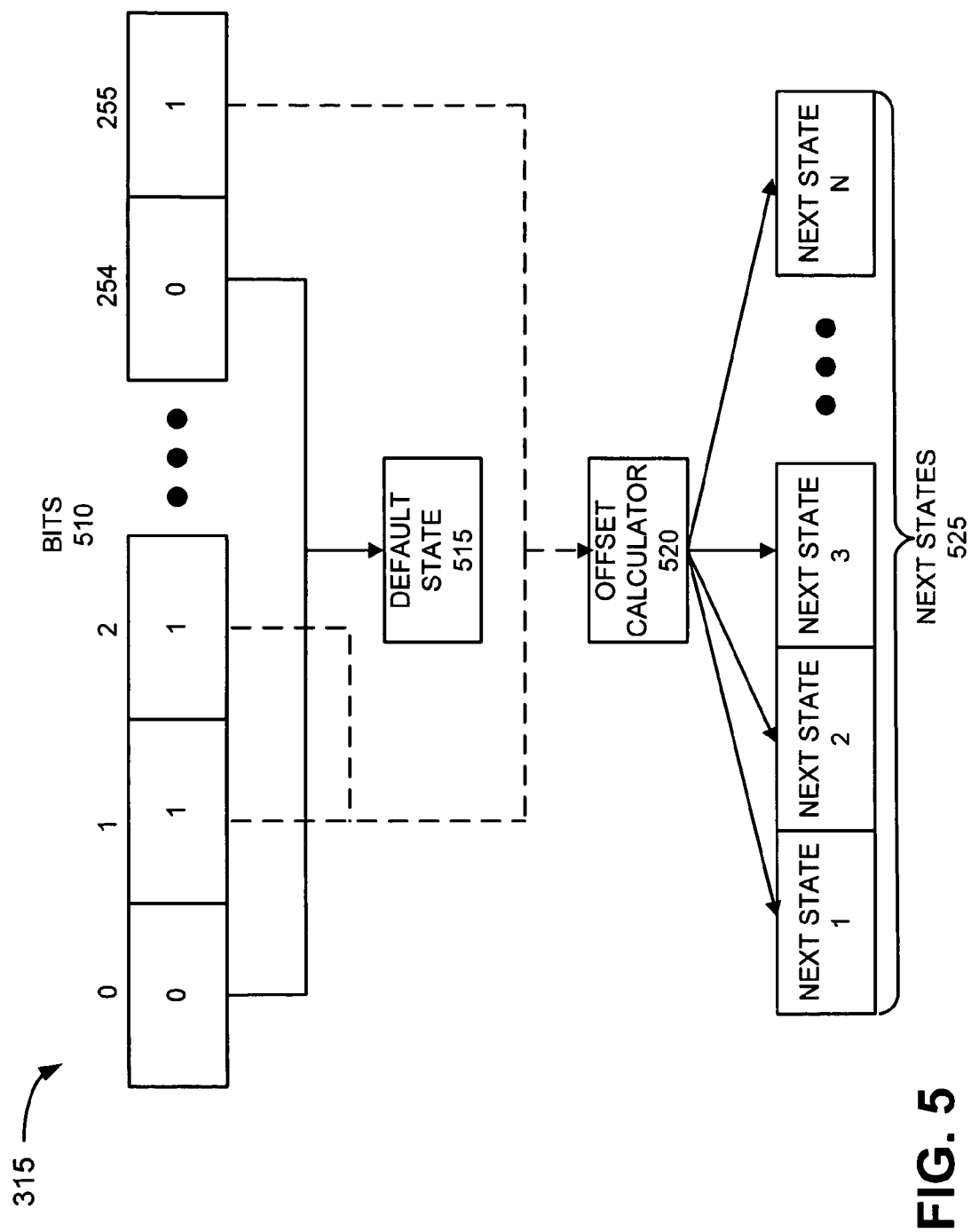
FIG. 5 is a diagram of an exemplary implementation of the bitmap depicted in FIG. 3.

FIG. 5 is a diagram of an exemplary implementation of bitmap 315. As illustrated in FIG. 5, bitmap 315 may include bits fields 510 in which next states are determined. In this implementation, there may be 256 bits fields 510, which may indexed based on the 256 ASCII values. However, in other implementations, there may be 128 bits fields 510, which may be indexed based on 128 ASCII values. Still further, in other implementations, bitmap 315 may include fewer, additional, or different fields, and/or a different number of fields. Each of bits fields 510 may have a value of "0" or "1," as illustrated in FIG. 5.

As previously mentioned, bitmap 315 may be utilized to determine a next state based on a received input. For example, as further illustrated in FIG. 5, bitmap 315 may include a default state 515, an offset calculator 520 and next states 525. In an exemplary implementation, an input character value may be matched to one of the bits fields 510. In the instances that bits fields 510 corresponds to a value of "0," the next state corresponds to default state 515. However, in instances when bits fields 510 corresponds to a value of "1," an offset from default state 515 may be calculated, by offset calculator 520, to select the next state from next states 525. In one implementation, offset calculator 520 may calculate the offset based on a number bit values of "1" prior to this state. By way of example, if the number of bit values of "1" prior to current state 505 is two, offset calculator 520 may determine the offset as two, and select "next state 2" as the next state. The next states stored in next states 525 may correspond to states rarely visited. A state may be considered rarely visited based on a value of N, as described below. As an aside, as will be described in greater detail below, when bits fields 510 is represented as 128 bits fields, when the current state is insensitive to an input ASCII value of 128 or higher, default state 515 may be utilized as a next state.

Exemplary Process

Embodiments described herein may provide methods, devices, and systems that may utilize both the DFA table and the bitmap to determine a next state. The selection between the utilization of the DFA table or the bitmap is based on the following.

Based on our studies of DFA behavior, statistical analysis reveals that the most frequently visited states in a DFA table have a distance less than N from an initial state. The value N may be represented by an integer value. The value N may be a static value (e.g., a user configurable value). By way of example, it may be assumed that a particular distance (or number of hops) away from an initial state represents the most frequently visited states. Alternatively, the value N may be a dynamic value. For example, the value N may be determined by a counter that determines the most frequently visited states in a DFA. Table 1 lists percentages of states with different distances (i.e., hops) from an initial state for all DFAs studied.

TABLE 1

| | Hops | | | | | |
|---|---|---|---|---|---|---|
| | 1 | 2 | 3 | 4 | 5 | 6 |
| States | 3433 | 7949 | 13285 | 19262 | 25857 | 32986 |
| Ratio | 0.95% | 2.19% | 3.67% | 5.32% | 7.14% | 9.11% |

| | Hops | | | | |
|---|---|---|---|---|---|
| | 7 | 8 | 9 | 10 | All |
| States | 40721 | 48693 | 57074 | 66457 | 362038 |
| Ratio | 11.25% | 13.45% | 15.76% | 18.73% | 100% |

In Table 1, the hops represent the number of hops or a distance from an initial state. With respect to each hop, the number of states and a ratio (in terms of percentage of the total number of states) is provided. For example, it may be assumed that the most frequently visited states have a distance or hop count less than 4 (i.e., N=4). Based on Table 1, if the distance from a current state is over a user-configured value (e.g., 4 or some other selected hop count), the state may be represented by a bitmap state, since the state may be considered as a rarely visited state. On the other hand, if the distance from a current state is equal to or less than the user-configured value, the state may be represented by a DFA table. Similar configurations may be implemented when the value of N is a dynamic value, as previously described.

In terms of memory consumption, let N represent the number of hops, $X\%$ represent the percentage of states less than N hops, and let T represent the total number of states in the DFAs. Based on this representation, the total memory consumption may correspond to the following exemplary expression:

$$(X\%*(99.92\%*50\%+0.08\%*8.2\%)+(100-X)\%*8.2\%)\\*512*T=X\%*49.97\%+(100-X)\%*8.2\% \qquad \text{Exp. 1}$$

The percentage of memory is a function of N. Table 2 shows memory consumption for N having a value from 1 to 10:

TABLE 2

| | N | | | | | | | | | |
|---|---|---|---|---|---|---|---|---|---|---|
| | 1 | 2 | 3 | 4 | 5 | 6 | 7 | 8 | 9 | 10 |
| Ratio | 8.60% | 9.11% | 9.73% | 10.42% | 11.18% | 12.01% | 12.98% | 13.82% | 14.78% | 16.02% |

Based on Table 2, the amount of memory used for DFAs may be reduced by approximately 90% when N=4, and approximately 88% when N=6. Further, the reduction of memory consumption may not impact the performance of pattern matching.

Additionally, based on our studies of DFA behavior, it has been determined for all DFAs generated, that 99.92% of states are insensitive to input characters whose ASCII values are over 127. In other words, the next states for these states are the same for any input characters whose ASCII values are over 127 (e.g., 128-255). Based on these findings, a hybrid DFA representation is described herein, that may utilizing the amount of memory analogous to that of a bitmap, while maintaining the matching speed of a DFA table.

Figure 6A:
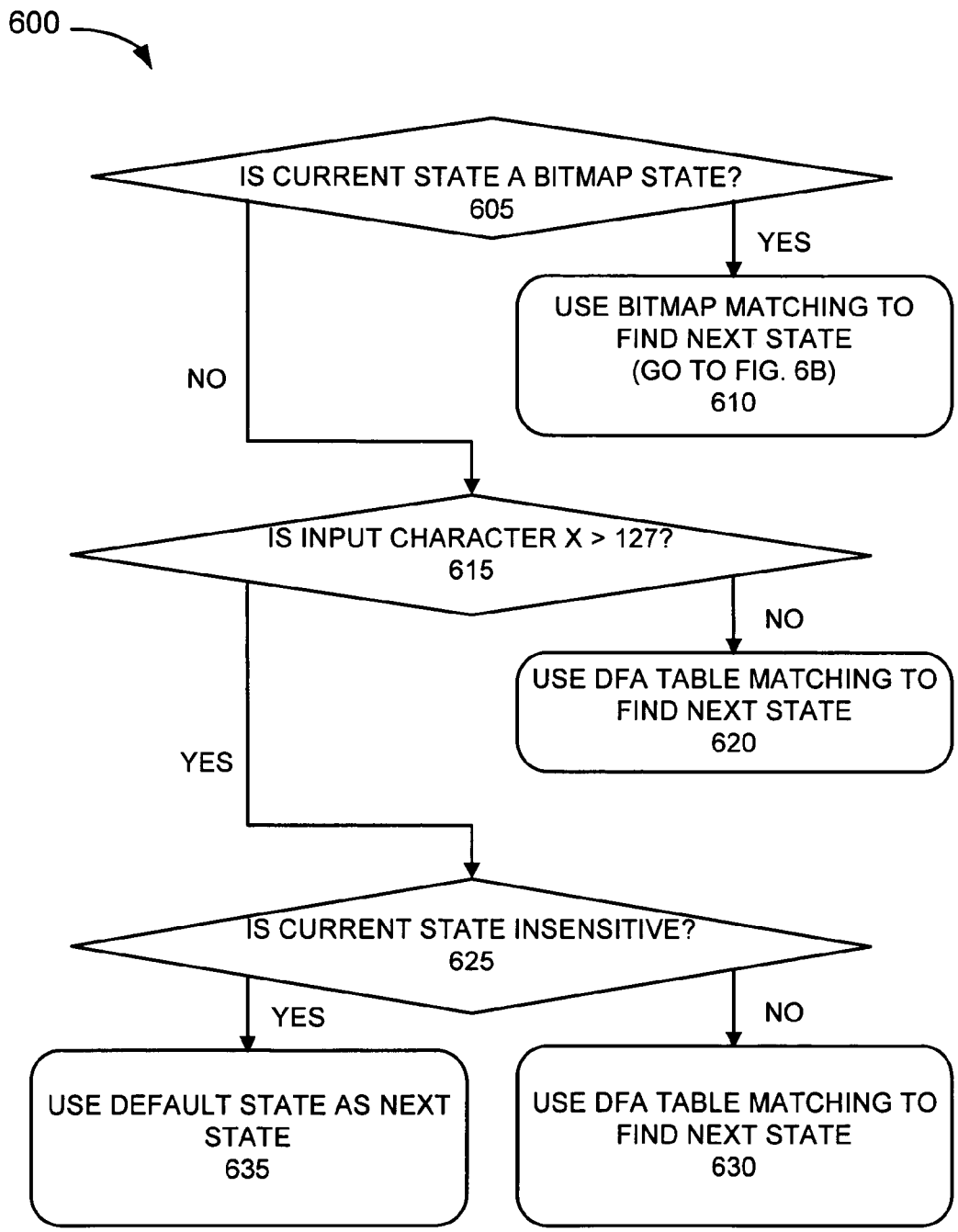
FIGS. 6A and 6B are flow diagrams illustrating an exemplary process for pattern matching.
Figure 6B:
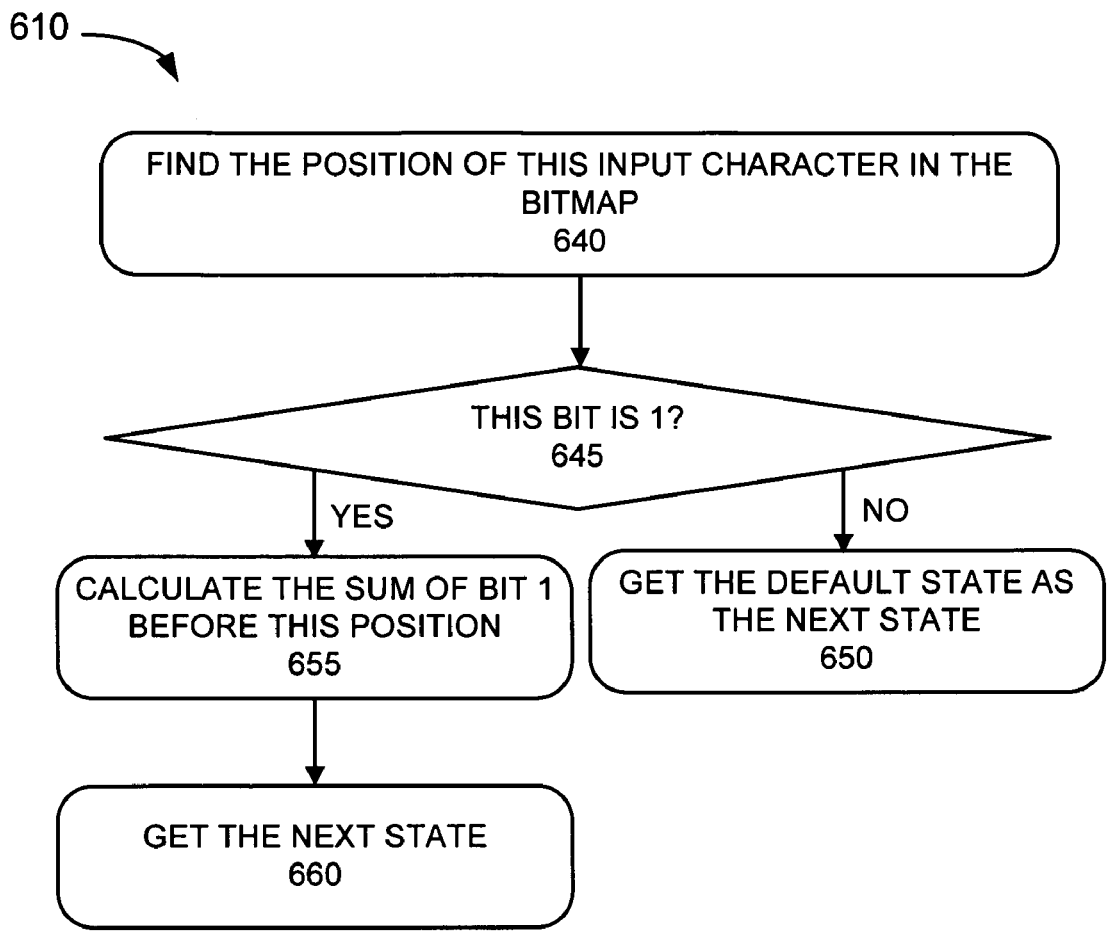

FIGS. 6A and 6B are flow diagrams illustrating an exemplary process 600 for pattern matching to identify attacks, threats, and/or malicious traffic based on a DFA. Process 600 may be performed by hardware, or a combination of hardware and software in network device 115. In another implementation, one or more operations associated with process 600 may be performed by another device in conjunction with network device 115. Process 600 will be described in conjunction with other figures.

Figure 7:
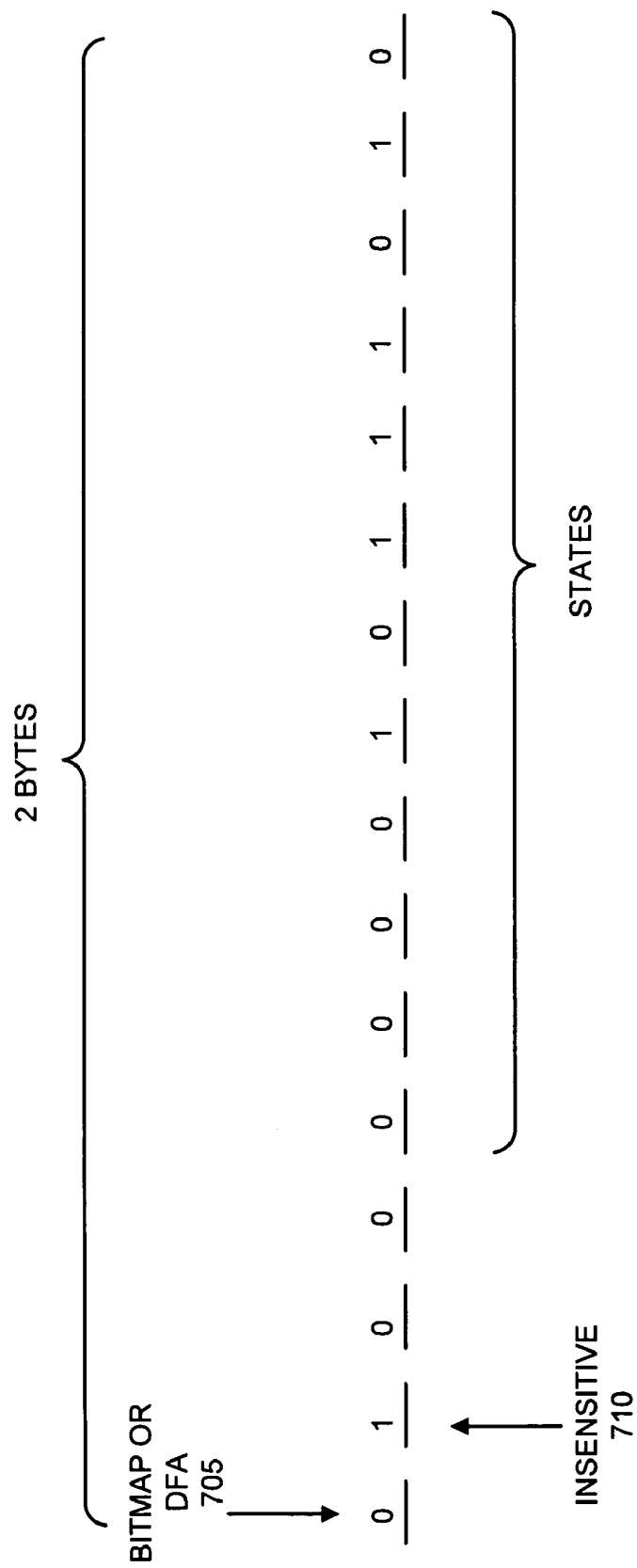
FIG. 7 is a diagram of an exemplary representation of a DFA state.

Process 600 may begin with determining whether the current state is a bitmap state (block 605). For example, a DFA state may be represented in two bytes. FIG. 7 is a diagram illustrating an exemplary representation of a DFA state. As illustrated, the two bytes may include bits assigned to represent states (e.g., 12 bits), as well as a bit 705 to represent whether the state is a bitmap state or not, and a bit 710 to represent whether the state is insensitive to input characters whose ASCII values are over 127. The values of bits 705 and 710 may be generated during compile time of the hybrid DFA. DFA engine 305 may determine whether the current state is a bitmap state or not based on bit 705.

It will be appreciated that whether the state is a bitmap state or not may be based on the value of N. The value of N may be user-configurable and/or a static value. Alternatively, the value of N may be a dynamic value. For example, network device 115 may count the number of times a state is visited within a period of time and correspondingly alter the value of N. In this way, network device 115 may adapt its pattern matching according to the network traffic it receives, and differentiate states considered to be frequently visited and states considered to be rarely visited.

When it is determined that the current state corresponds to a bitmap state (block 605—YES), bitmap matching may be used to find the next state (block 610). FIG. 6B is a diagram illustrating exemplary details of block 610 of FIG. 6A, in which a next state is determined based on bitmap matching. As illustrated in FIG. 6B, a position of the input character may be found in the bitmap (block 640). For example, referring to FIG. 5, DFA engine 305 may determine the position of the input character with respect to bits fields 510. By way of example, if the input character is a lower case "a," the third field of bits field 510 (indicated as number "2" in FIG. 5) may correspond to a mapping for the lower case "a." Thus, DFA engine 305 may determine the position of the input character with respect to bits fields 510.

Referring to FIG. 6B, it may be determined whether a bit of the bitmap is a 1 (block 645). For example, as illustrated in FIG. 5, bits fields 510 may include a value of 1 or a value of 0. DFA engine 305 may determine whether the value associated with the appropriate field of bits fields 510 (e.g., the field that corresponds to the lower case "a") is a 1 or a 0.

Referring to FIG. 6B, when it is determined that the bit does not have a value of 1 (block 645—NO), the default state may correspond to the next state (block 650). For example, as illustrated in FIG. 5, DFA engine 305 may determine that the appropriate field of bits fields 510 has a value of 0, such as fields numbered 0 and 254. In such a case, DFA engine 305 may select the next state to correspond to default state 515.

Referring to FIG. 6B, when it is determined that the bit does have a value of 1 (blocks 645—YES), a summation of bits having a value of 1, before this position, may be calculated (block 655). For example, as illustrated in FIG. 5, DFA engine 305 may determine that the appropriate field of bits fields 510 has a value of 1, such as fields numbered 1, 2, and 255. In such a case, offset calculator 520 may calculate an offset, as previously described. DFA engine 305 may select the next state from next states 525 based on the calculated offset.

Referring to FIG. 6A, when it is determined that the current state does not correspond to a bitmap state (block 605—NO), it may be determined whether the input character is greater than 127 (block 615). For example, based on ASCII values having a range from 0 to 255, some characters are represented having a value over 127, while other characters are represented having a value equal to or less than 127. DFA engine 305 may determine whether the value associated with the input character is greater than 127.

Figure 8:
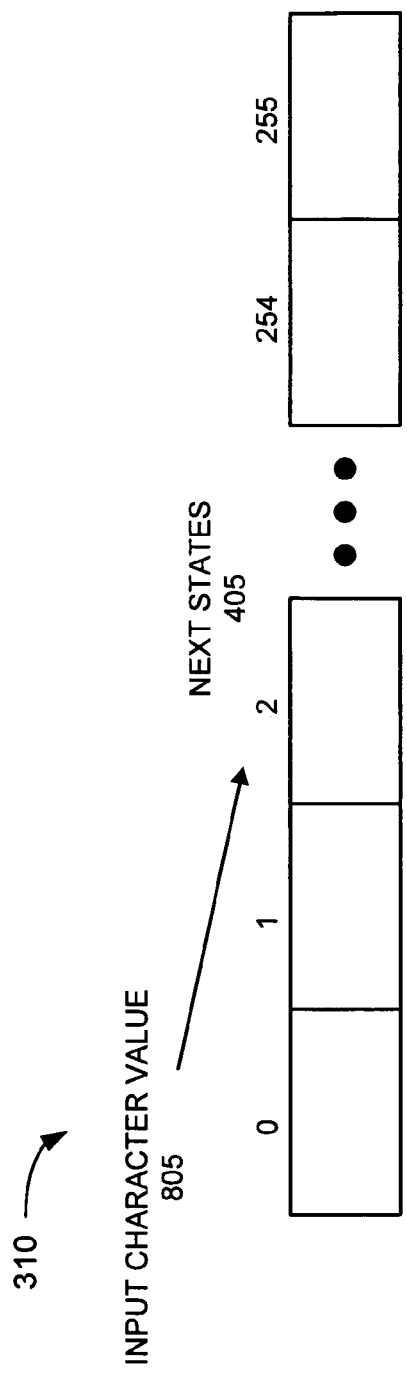
FIG. 8 is a diagram of an exemplary implementation to determine a next state.

When it is determined that the value associated with the input character is not greater than 127 (block 615—NO), DFA engine 305 may use DFA table 310 to find the next state (block 620). DFA engine 305 may find the next state in DFA table 310 based on the current state and input character value. For example, as illustrated in FIG. 8, DFA engine 305 may utilize input character value 805 as an index to the appropriate field in next states 405.

Referring to FIG. 6A, when it is determined that the value associated with the input character is greater than 127 (block 615—YES), it may be determined whether the current state is insensitive (block 625). As previously described, a state may be considered insensitive when the next state is the same for any input character whose ASCII value is greater than 127. In other words, a state may transition to the same next state when the input ASCII values are between 128 through 256. Referring to FIG. 7, DFA engine 305 may determine whether the current state is insensitive based on bit 710.

Referring to FIG. 6A, when it is determined that the current state is insensitive (block 625—YES), a default state may be used as the next state (block 635). For example, in one implementation, when DFA table 310 corresponds to an array of 128 next states 410 (as illustrated in FIG. 4B), DFA engine 305 may determine the next state as default state 415. In another implementation, when DFA table 310 corresponds to an array of 256 next states, DFA engine 305 may match the input character value with the corresponding next state 405.

Referring to FIG. 6A, when it is determined that the current state is not insensitive (block 625—NO), DFA matching may be used to find the next state (block 630). For example, as previously described in block 620, DFA engine 305 may determine a next state.

Although FIGS. 6A and 6B illustrate an exemplary process 600, in other implementations, fewer, additional, or different operations may be performed. For example, network device 115 may identify attacks, threats, and/or malicious traffic when the state (e.g., the current state or the next state) corresponds to a final state, where the final state is indicative of an attack, threat, etc. In such a case, network device 115 may drop the data unit (e.g., packet, non-packet, byte, bits, etc.) and/or perform some other type of processing or action.

Conclusion

The foregoing description of implementations provides an illustration, but is not intended to be exhaustive or to limit the implementations to the precise form disclosed. Modifications and variations are possible in light of the above teachings or may be acquired from practice of the teachings. For example, although a DFA table and a bitmap are described as data structures that contain states of a DFA, in other implementations, data structures other than the DFA table and/or the bitmap may be utilized. In this regard, states of a DFA may be apportioned between two or more types of data structures. Additionally, while it has been described that the DFA table has the drawback of memory consumption but the benefit of matching speed (e.g., based on one memory access), while the bitmap has the drawback of matching speed (e.g., based on two memory accesses) but the benefit of memory consumption, other data structures that have other types of complementary benefits and drawbacks may be utilized. Accordingly, in such instances, apportionments of states between other data structures may or may not be based on frequently visited states and infrequently visited states, as described herein.

In addition, while a series of blocks has been described with regard to the process illustrated in FIGS. 6A and 6B, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. For example, a processor 302 may include one or more processors. Where only one item is intended, the term "one" or similar language is used. Further, the phrase "based on" is intended to be interpreted as "based, at least in part, on,"

unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   receiving, by a device, a data unit;
   determining, by the device, whether a current state, associated with a deterministic finite automata (DFA) that includes a first portion of states in a bitmap and a second portion of states in a DFA table, is a bitmap state;
   determining, by the device, whether a value corresponding to the data unit is greater than a threshold value when the current state is not the bitmap state;
   determining, by the device, whether the current state is insensitive when the value corresponding to the data unit is greater than the threshold value,
      the current state being insensitive when each next state is a same state for the current state;
   selecting, by the device, a default state, as a next state for the current state, when the current state is insensitive;
   selecting, by the device, a different state, as the next state for the current state, when the current state is not insensitive or when the value corresponding to the data unit is less than the threshold value; and
   dropping, by the device, the data unit when the different state is a final state that indicates that the data unit is malicious.

2. The method of claim 1, where selecting the different state as the next state includes:
   selecting the different state, as the next state for the current state, based on bitmap matching when the current state is not insensitive.

3. The method of claim 1, where selecting the different state as the next state includes:
   selecting the different state, as the next state for the current state, based on DFA table matching when the value corresponding to the data unit is less than the threshold value.

4. The method of claim 1, further comprising:
   selecting the next state based on bitmap matching when the current state is the bitmap state.

5. The method of claim 1, further comprising:
   utilizing bits to represent the current state; and
   assigning one of the bits to indicate whether the current state is the bitmap state.

6. The method of claim 1, further comprising:
   utilizing bits to represent the current state; and
   assigning one of the bits to indicate whether the current state is insensitive.

7. The method of claim 1, further comprises:
   selecting a value that differentiates states considered to be frequently visited and states considered to be rarely visited; and
   generating, based on the selected value, the DFA table that includes the second portion of states considered to be frequently visited and the bitmap that includes the first portion of states considered to be rarely visited.

8. The method of claim 7, where the value is one of:
   a static value, or
   a dynamic value.

9. The method of claim 1, where the threshold value is based on an American Standard Code for Information Interchange (ASCII) value of 127.

10. The method of claim 1, where the device is at least one of:
    a network security device, or
    a router.

11. The method of claim 1, where dropping the data unit includes:
    determining whether the different state corresponds to the final state that is indicative of a threat, an attack, or malicious traffic; and
    dropping the data unit when the different state corresponds to the final state.

12. A device comprising:
    one or more processors to:
    receive a data unit;
    determine whether a current state, associated with a deterministic finite automata (DFA) that includes a first portion of states in a bitmap and a second portion of states in a DFA table, is a bitmap state;
    determine whether a data value corresponding to the data unit is greater than a threshold value when the current state is not a bitmap state;
    determine whether the current state is insensitive when the data value corresponding to the data unit is greater than the threshold value,
       the current state being insensitive when each next state is a same state for the current state;
    select a default state, as a next state for the current state, when the current state is insensitive;
    select a different state as the next state for the current state when the current state is not insensitive or when the data value corresponding to the data unit is less than the threshold value;
    determine whether the next state corresponds to a final state indicative of a threat, an attack, or malicious traffic; and
    drop the data unit when the different state is the final state indicative of the threat, the attack, or the malicious traffic.

13. The network device of claim 12, where the first portion of states in the bitmap includes first states that are visited less frequently than second states in the second portion of states in the DFA table.

14. The network device of claim 13, where the one or more processors are further to:
    utilize the bitmap to select the next state when the current state is the bitmap state.

15. The network device of claim 13, where the one or more processors are further to:
    generate the DFA table and the bitmap based on a value that differentiates between states frequently visited and states infrequently visited.

16. The network device of claim 15, where the value relates to a distance from an initial state,
    the initial state being the current state or another state.

17. The network device of claim 15, where one or more processors are further to:
    determine the value based on counting of a frequency in which each state, of the DFA, is visited.

18. The network device of claim 13, where, when selecting the different state as the next state, the one or more processors are to:
utilize the DFA table to select the different state as the next state when the current state is not insensitive.

19. The network device of claim 13, where, when selecting the different state as the next state, the one or more processors are to:
utilize the DFA table to select the different state as the next state when the data value corresponding to the data unit is less than the threshold value.

20. The network device of claim 12, where, when selecting the default state as the next state for the current state, the one or more processors are to:
select the default state as the next state based on DFA table matching.

21. A non-transitory computer-readable medium comprising:
one or more instructions that, when executed by at least one processor, cause the at least one processor to:
receive a data unit;
determine whether a current state, associated with a deterministic finite automata (DFA) that includes a first portion of states in a bitmap and a second portion of states in a DFA table, is a bitmap state;
determine whether a value corresponding to the data unit is greater than a threshold value when the current state is not the bitmap state;
determine whether the current state is insensitive when the value corresponding to the data unit is greater than the threshold value,
the current state being insensitive when each next state is a same state for the current state;
select a default state, as a next state for the current state, when it is determined that the current state is insensitive;
select a different state, as the next state for the current state, when the current state is not insensitive or when the value corresponding to the data unit is less than the threshold value; and
drop the data unit when the different state is a final state that is indicative of a threat, an attack, or malicious traffic.

22. The non-transitory computer-readable medium of claim 21, further comprising:
one or more instructions that cause the at least one processor to:
select next state for the current state based on bitmap matching when the current state is the bitmap state.

23. The non-transitory computer-readable medium of claim 21, where the one or more instructions to select the different state as the next state include:
one or more instructions to:
select the different state, as the next state for the current state, based on DFA table matching when the value corresponding to the data unit is less than the threshold ASCII value.

24. A device comprising:
one or more processors to:
store a deterministic finite automata (DFA) that includes a first portion of states in a bitmap and a second portion of states in a DFA table;
receive a data unit;
determine whether a value corresponding to the data unit is greater than a threshold value;
determine whether a current state associated with the DFA is insensitive,
the current state being insensitive when each next is a same state for the current state;
select a default state, as a next state for the current state, when the value is greater than the threshold value and the current state is insensitive,
select a different state, as the next state for the current state, when the value is less than the threshold value or when the current state is not insensitive; and
perform a particular action or process when the different state is a final state that indicates that the data unit is malicious.

25. The network device of claim 24, where the one or more processors are further to:
determine whether the current state is a bitmap state; and
select the next state for the current state based on the bitmap when the current state is the bitmap state.

* * * * *